US009650845B2

(12) United States Patent
Shield et al.

(10) Patent No.: US 9,650,845 B2
(45) Date of Patent: May 16, 2017

(54) APPARATUS FOR IMPROVING FLANGED CONNECTIONS

(71) Applicant: Subsea Riser Products Limited, Woking (GB)

(72) Inventors: John Shield, London (GB); Stephen Scott, Surrey (GB)

(73) Assignee: Subsea Riser Products Limited, Woking (GB)

( * ) Notice: Subject to any disclaimer, the term of this patent is extended or adjusted under 35 U.S.C. 154(b) by 0 days.

(21) Appl. No.: 14/388,438

(22) PCT Filed: Mar. 28, 2013

(86) PCT No.: PCT/GB2013/050818
§ 371 (c)(1),
(2) Date: Sep. 26, 2014

(87) PCT Pub. No.: WO2013/144633
PCT Pub. Date: Oct. 3, 2013

(65) Prior Publication Data
US 2015/0060082 A1 Mar. 5, 2015

(30) Foreign Application Priority Data

Mar. 29, 2012 (GB) .................................. 1205559.6
Aug. 20, 2012 (GB) .................................. 1214831.8

(51) Int. Cl.
*F16L 37/08* (2006.01)
*F16L 35/00* (2006.01)
(Continued)

(52) U.S. Cl.
CPC ............ *E21B 17/085* (2013.01); *E21B 17/01* (2013.01); *F16L 1/26* (2013.01); *F16L 19/0206* (2013.01)

(58) Field of Classification Search
None
See application file for complete search history.

(56) References Cited

U.S. PATENT DOCUMENTS 3,198,555 A * 8/1965 Johnson ................ E21B 17/046
285/330
5,871,239 A 2/1999 Boscaljon et al.
(Continued)

FOREIGN PATENT DOCUMENTS

DE  102006007909 B3  2/2007
EP       0528079 A1   7/1991
(Continued)

*Primary Examiner* — Matthew R Buck
*Assistant Examiner* — Douglas S Wood
(74) *Attorney, Agent, or Firm* — Hayes Soloway PC

(57) ABSTRACT

The connector includes a sleeve (4) which is screwed on to a thread (18) provided on an upper axial end of the lower riser section (1). The sleeve (4) encloses a lower end of an upper riser section (2) and is retained thereto. Once the sleeve (4) is secured to the lower riser section, this loosely secures the upper riser section (2) to the lower riser section (1). A tensioning tool then stretches the sleeve (4) upwardly and a retaining collar (5) is then maneuvered in order to retain the sleeve (5) in this tensioned state after the release of the tensioning tool. This creates a preloaded connection between the upper riser section (2) and the lower riser section (1).

20 Claims, 13 Drawing Sheets

(51) Int. Cl.
*F16L 37/12* (2006.01)
*E21B 17/01* (2006.01)
*F16L 55/00* (2006.01)
*E21B 17/08* (2006.01)
*F16L 1/26* (2006.01)
*F16L 19/02* (2006.01)

(56) References Cited

U.S. PATENT DOCUMENTS

| 5,882,044 A | 3/1999 | Sloane |
| 6,375,815 B1 | 4/2002 | Lynn et al. |
| 2007/0152441 A1 | 7/2007 | Jennings et al. |

FOREIGN PATENT DOCUMENTS

| EP | 0899495 A3 | 1/2001 |
| EP | 2372211 A1 | 5/2011 |
| GB | 2144507 A | 3/1985 |
| GB | 2147072 A | 5/1985 |
| WO | 2004016977 A1 | 2/2004 |

\* cited by examiner

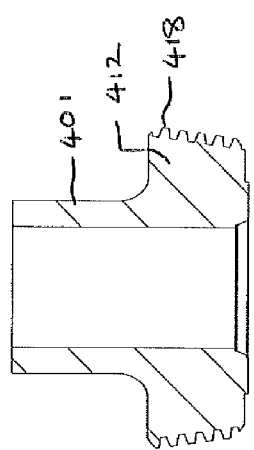
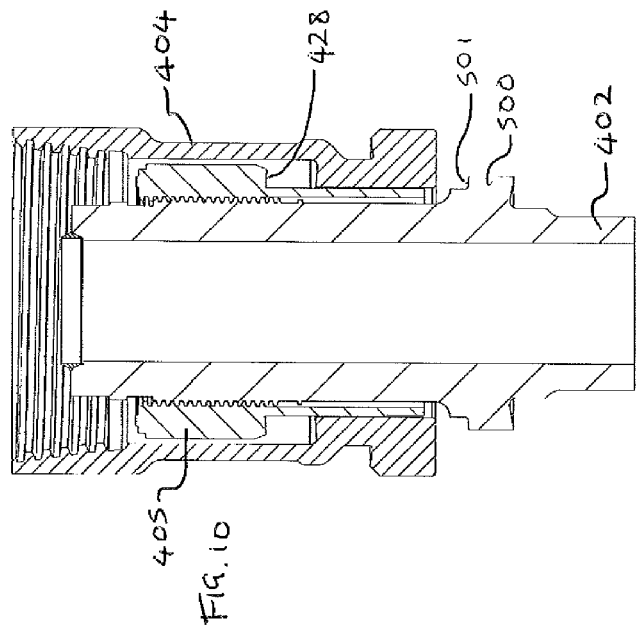
FIG. 10
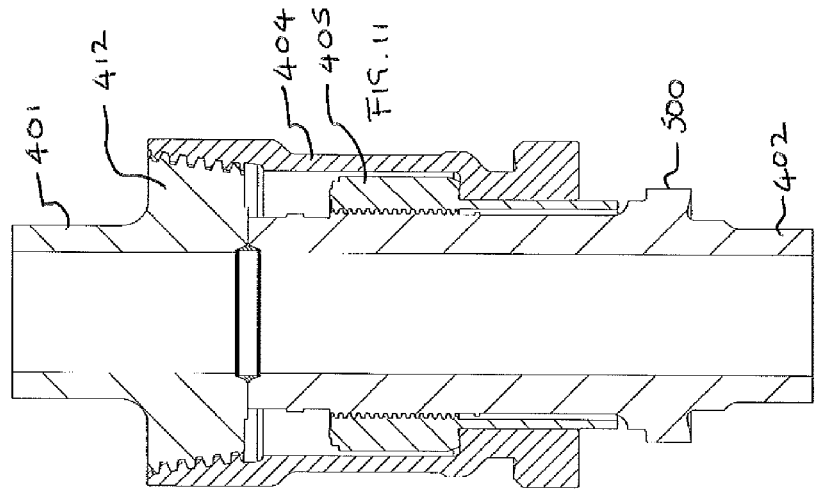
FIG. 11

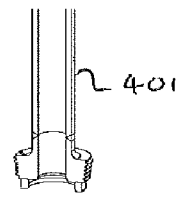
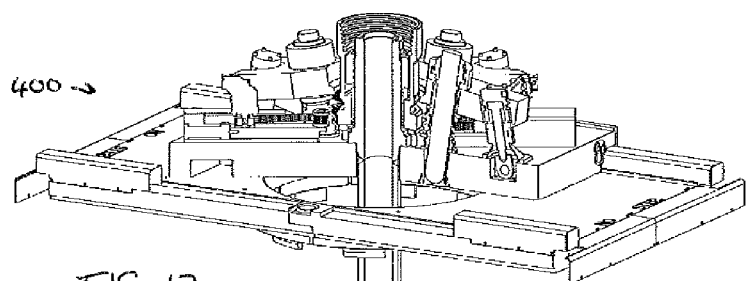
FIG. 12
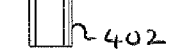
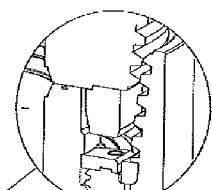
FIG. 13b
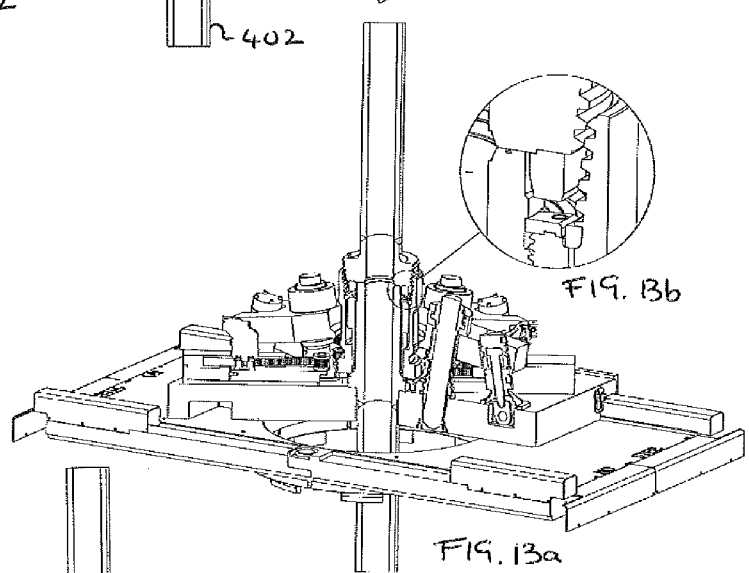
FIG. 13a
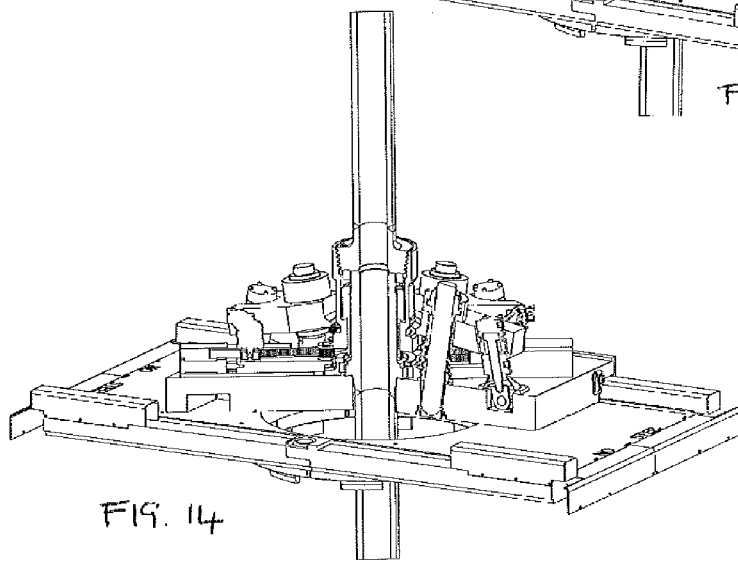
FIG. 14

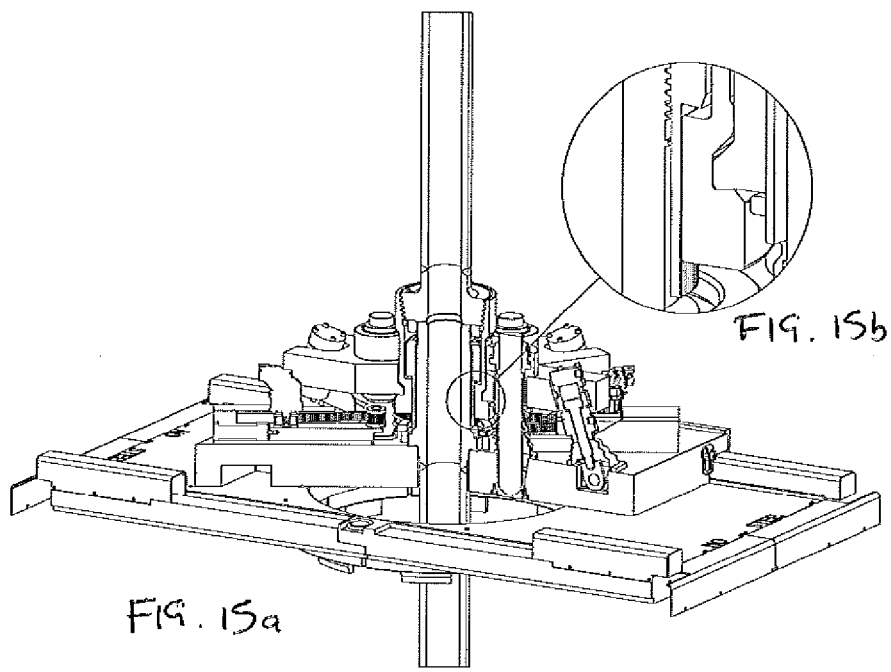
FIG. 15a
FIG. 15b
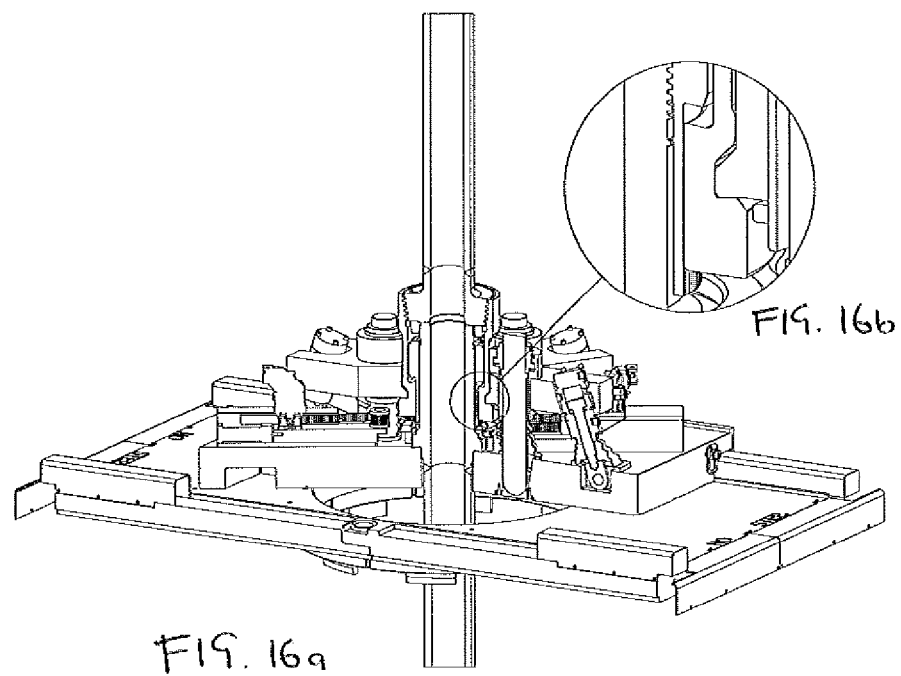
FIG. 16a
FIG. 16b

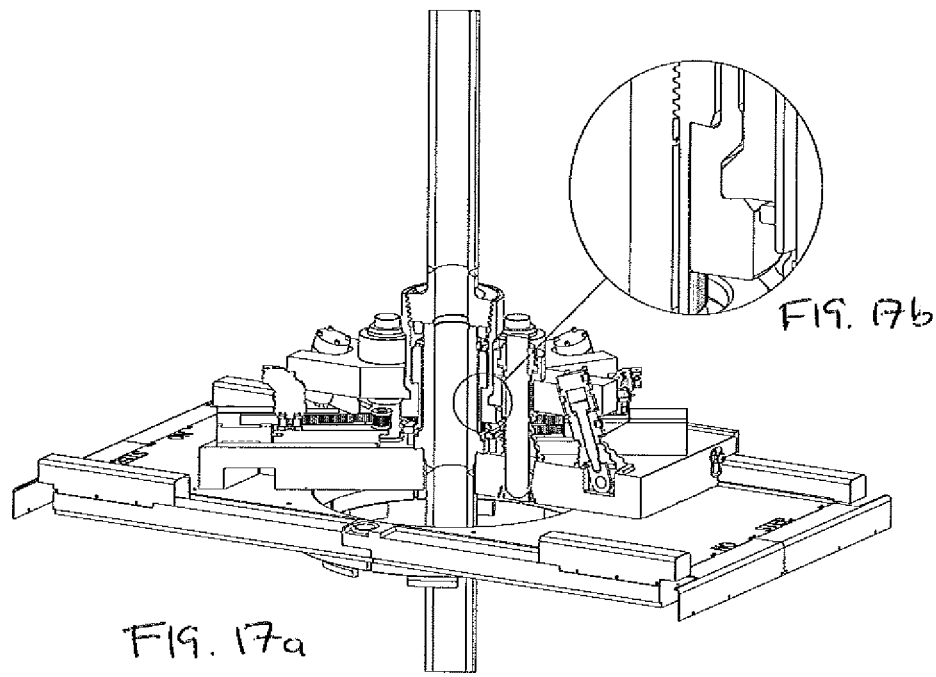
FIG. 17a
FIG. 17b
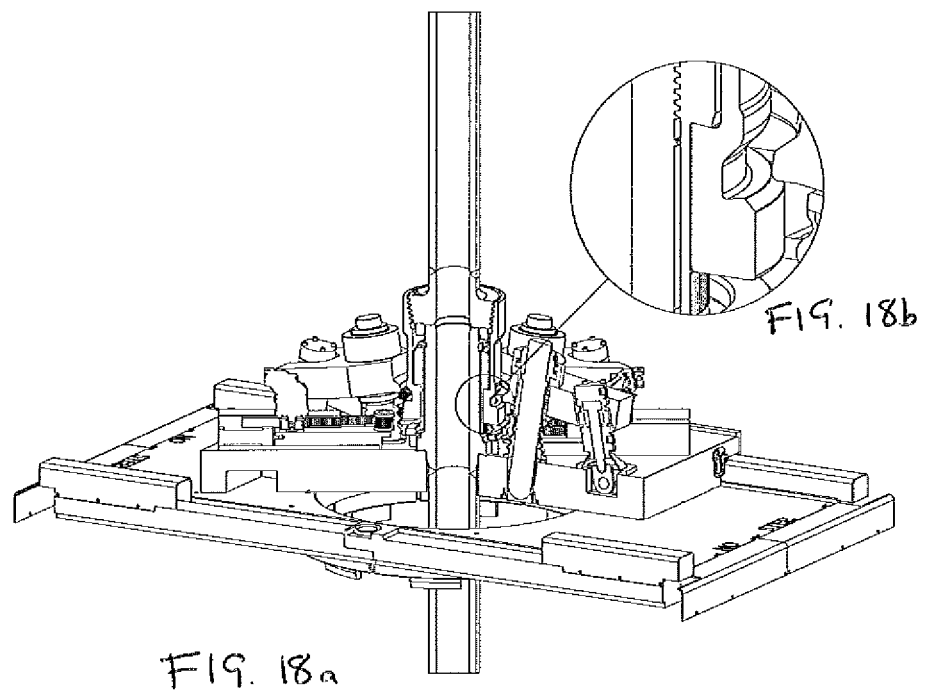
FIG. 18a
FIG. 18b

APPARATUS FOR IMPROVING FLANGED CONNECTIONS

FIELD OF THE INVENTION

The present invention relates to a connector, an assembly including two pipe sections and a connector and to a method of connecting two pipe sections. In particular, the present invention relates to a derivative of a flange connector for use on conduits used in offshore oil exploration and production.

BACKGROUND TO THE INVENTION

This invention relates to a subsea flange connection used in the offshore oil and gas industry for connecting joints in a riser string or other components, for example, the connection may be used in other subsea components (e.g. pipelines).

Risers and flowlines consist of sections of pipe that need to be secured together to form a contiguous pipe. Accordingly, the securement between the different pipe sections needs to be strong and reliable. The sections of pipe are often provided with flanges to enable the pipe section to be easily secured together. Each flange may include securement apertures radially spaced around the flanges. Corresponding securing nuts and bolts may then be used to secure the flanges together. Each pair of nut and bolt requires the nuts to be rotated multiple times in order to tighten the securement and provide an effective connection between the two sections of pipe. However, since each connection includes several pairs of nuts and bolts and each requires several or numerous rotations to effect the tightening, the time taken to effectively join the pipes can be relatively long. This is known as bolt torquing. An alternative method comprises bolt tensioning which involves initially stretching a threaded bar or stud and then winding down the nut (which can be done by hand). However, this method is slow as each stud needs to be stretched independently, requiring installing and removal of the tools from each stud thread. Since the riser cannot be used whilst the sections are being connected, this can be an expensive operation.

Similar flanged connections are used on subsea equipment; however, the number of components and complexity of motion typically precludes the use of robotic vehicles, so these connections are typically restricted to depths that divers can access. Subsea robotic connections are typically achieved with clamp hub connectors. However, this application is limited by the load and fatigue capacity which is often significantly reduced compared to a flanged connection.

It is an aim of the present invention to overcome at least one problem associated with the prior art whether referred to herein or otherwise.

SUMMARY OF THE INVENTION

According to a first aspect of the present invention there is provided a connector for connecting a first pipe section to a second pipe section, the connector comprising a sleeve comprising engagement means for engaging with the first pipe section, the connector further comprising a retaining member comprising engagement means for engaging with the second pipe section, the sleeve being operable between a rest configuration and a tensioned configuration and the retaining member being movable to retain the sleeve in the tensioned configuration characterised in that the sleeve is mounted to the retaining member and the second pipe section prior to the connection to the first pipe section and the retaining member locates concentrically between the sleeve and the second pipe section and wherein the sleeve comprises tool engagement means which enables a tensioning tool to stretch the sleeve and the retaining member is then manoeuvred in order to retain the sleeve in this tensioned state after the release of the tensioning tool.

Preferably the first pipe section comprises a first pipeline section and the second pipe section may comprise a second pipeline section.

Preferably the first pipeline section comprises a first riser section and the second pipeline section may comprise a second riser section.

The first pipeline section may comprise a first flowline section and the second pipeline section may comprise a second flowline section.

Preferably the connector comprises a subsea connector.

Preferably the pipe sections form a contiguous pipeline for the transfer and/or flow of fluid hydrocarbons. Preferably the pipe sections form an oil or gas pipeline.

Preferably the sleeve is engaged with the first pipe section. The sleeve may comprise an internal thread which may be arranged to engage with an external thread provided on the first pipe section.

Preferably the sleeve comprises an annular component.

Preferably the retaining member is engaged with the second pipe section.

Preferably the retaining member is mounted to the second pipe section.

Preferably the sleeve is mounted to the retaining member and/or the second pipe section.

The sleeve may be mounted to the retaining member and/or the second pipe section prior to connection to the first pipe section.

Preferably the sleeve is arranged, in use, to be secured to the first pipe section and then the sleeve is tensioned and retained in the tensioned state by the retaining member such that the first pipe section is sealed to the second pipe section with the pipe sections being axially urged towards each other by the tension in the sleeve.

The retaining member may comprise an annular component.

The retaining member may comprise an annular collar.

Preferably the retaining member is engaged with the second pipe section. The retaining member may comprise an internal thread which may be arranged to engage with an external thread provided on the second pipe section.

Preferably the retaining member comprises a securement portion which cooperates with a securement portion provided on the sleeve. Preferably the securement portions comprise abutment surfaces which abut each other to retain the sleeve in a tensioned configuration.

Preferably the sleeve comprises tool engagement means. Preferably a tool is engageable with the sleeve in order to place the sleeve in tension. In particular, the tool may move a second end of the sleeve away from a first end of the sleeve when the first end of the sleeve may be engaged with the first pipe section. Preferably the tool moves the second end of the sleeve away from the first pipe section. Specifically, the tool may move the second end of the sleeve away in an axial direction from the first pipe section.

The tool engagement means may comprise a groove located around the sleeve. The groove may comprise an annular grove which may be located around an outer periphery of the sleeve.

The sleeve may comprise an outer surface to enable a tool to rotate the sleeve. The outer surface of the sleeve may enable a drive roller (or a plurality of drive rollers) to rotate the sleeve. Preferably a single turn or less is required to secure the sleeve to the first riser section.

Preferably the retaining member comprises an annular collar which is concentrically arranged with the sleeve. More preferably the retaining member may be located within the sleeve and concentrically arranged with the sleeve.

Preferably the collar comprises an outwardly projecting shoulder. The outwardly projecting shoulder may comprise a circumferential shoulder extending around the outer periphery of the collar.

Preferably the sleeve comprises an inwardly projecting shoulder. The inwardly projecting shoulder may comprise a circumferential shoulder extending around the inner periphery of the sleeve.

Preferably the outwardly projecting shoulder of the collar is arranged to abut the inwardly projecting collar of the sleeve in order to maintain the sleeve in a tensioned state.

Preferably the connector is arranged to urge the first pipe section towards the second pipe section. More preferably the connector is arranged to axially urge the first pipe section towards the second pipe section.

Preferably the connector is arranged to compress a gasket located between the first pipe section and the second pipe section.

Preferably the connector comprises a gasket and more preferably comprises an annular gasket.

Preferably the collar locates concentrically between the sleeve and the second pipe section.

The present invention may comprise a top sub-assembly comprising the second pipe section, the retaining member and the sleeve. The present invention may comprise a bottom sub-assembly comprising the first pipe section.

The present invention may comprise a bottom sub-assembly comprising the second pipe section, the retaining member and the sleeve. The present invention may comprise a top sub-assembly comprising the first pipe section.

The connector may comprise landing means to enable the bottom (lower) sub-assembly to be landed on a support surface. The landing means may comprise a landing shoulder which may be located on the bottom (lower) sub-assembly. The landing shoulder may be provided on the second pipe section. The landing shoulder may comprise a part of a circumferential flange provided on the second pipe section. The circumferential flange may be spaced from the end of the second pipe section and may be spaced from an end flange of the second pipe section. The landing shoulder may be arranged, in use, to locate below a lower end of the sleeve such that the bottom (lower) sub-assembly is landed and supported at a position located below the sleeve. The landing shoulder may be arranged, in use, to be located externally of the inner volume/space encompassed by the sleeve.

The connector may comprise connector retaining means to retain the connector to a pipe section. The connector retaining means may comprise means for retaining the sleeve to the connector and/or collar and/or pipe section.

The second pipe section may comprise the connector retaining means. The second pipe section may comprise an abutment to prevent the connector (or sleeve) from moving along the second pipe section in a first direction. The collar may be arranged to prevent the connector (or sleeve) from moving along the second pipe section in a second (opposite) direction.

The invention comprises a flanged connector, whereby the traditional array of nuts and studs or bolts is replaced by a single circumferentially continuous sleeve and mechanisms for connecting the sleeve to each flange. The sleeve is stretched along the axis of the conduit by means of hydraulic tooling and then held in the tensioned position with a mechanism on one of the flanges. Once connected, the sleeved flange's performance is comparable to a high performance compact flange, in terms of static capacity, sealing and fatigue performance.

The fewer components and simplicity of operation greatly improve the speed of connection and also enables the sleeved flange connector to be operated subsea by robotic tooling.

According to a second aspect of the present invention there is provided an assembly comprising a connector, a first pipe section and a second pipe section, the connector comprising a sleeve comprising engagement means for engaging with the first pipe section, the connector further comprising a retaining member comprising engagement means for engaging with the second pipe section, the sleeve being operable between a rest configuration and a tensioned configuration and the retaining member being movable to retain the sleeve in the tensioned configuration.

According to a third aspect of the present invention there is provided a method of connecting a first pipe section to a second pipe section, the method comprising engaging a sleeve with the first pipe section, the method further comprising engaging a retaining member with the second pipe section, the method further comprising tensioning the sleeve from a rest configuration to a tensioned configuration and moving the retaining member to retain the sleeve in the tensioned configuration characterised by mounting the sleeve to the retaining member and the second pipe section prior to connecting the second pipe section to the first pipe section and wherein the retaining member locates concentrically between the sleeve and the second pipe section and stretching the sleeve with a tensioning tool and then manoeuvring the retaining member in order to retain the sleeve in this tensioned state after the release of the tensioning tool.

BRIEF DESCRIPTION OF THE DRAWINGS

The invention will now be further described, by way of example only, and with reference to the accompanying drawings, in which:

FIG. 10 is a side cross-section of another embodiment of a connector prior to connecting a first riser section to a second riser section.

FIG. 11 is a side cross-section of another embodiment of a connector connecting a first riser section to a second riser section.

FIG. 12 to FIG. 18 show a sequence of arrangements in which another embodiment of a connector is used to secure a first riser section to a second riser section.

DESCRIPTION OF THE PREFERRED EMBODIMENTS

Figure 1:
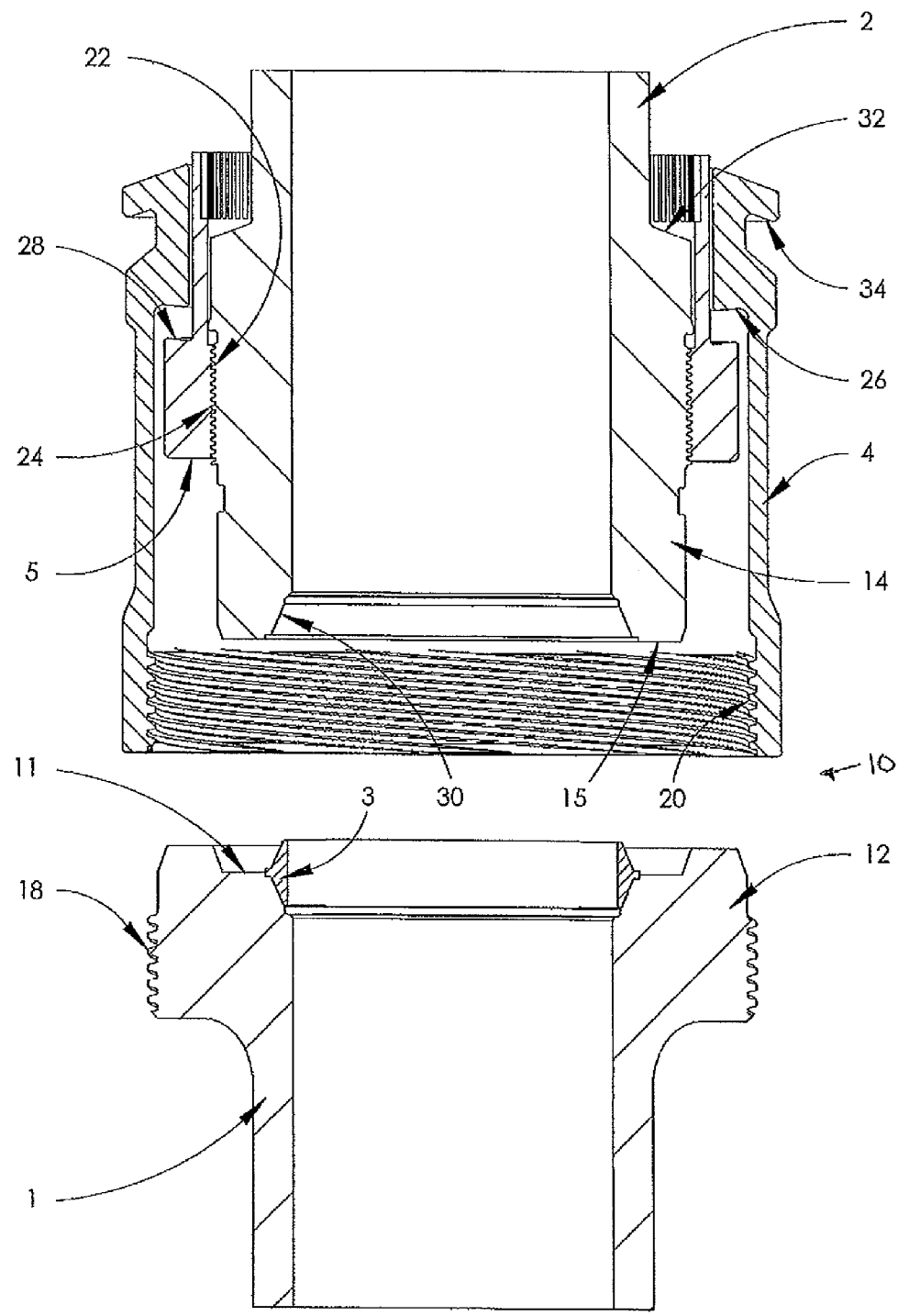
FIG. 1 is a side cross-section of a preferred embodiment of a connector prior to connecting a first riser section to a second riser section.

The present invention relates to a connection comprising both an upward facing flange and a downward facing flange, which are held together using a 'sleeve' type component. The sleeve 4 is threaded at one end and screwed directly onto the upward facing flange. It is then held at the other end by a threaded collar 5 which is attached to the downward facing flange.

The present invention effectively comprises a sleeve tensioning mechanism which involves initially stretching the sleeve 4 and then winding up a collar 5 to retain the sleeve 4 in tension. The lower end of the sleeve 4 is secured to an upper end of a first pipe section 1 whilst the collar 5 is mounted to a second pipe section 2. Accordingly, the tension in the sleeve 4 urges the pipe sections 1, 2 axially towards each other whilst the configuration of the sleeve 4 and the collar 5 also secure and lock the pipe sections 1, 2 together.

Briefly, the connector includes a sleeve 4 which is screwed on to a thread 18 provided on an upper axial end of the lower riser section 1. The thread 18 may alternatively be equally any securing mechanism with sufficient load capacity. However, the preferred embodiment of the present invention will be described with reference to a thread 18. Alternative versions may comprise a bayonet fitting or a latch mechanism. Such versions may provide better solutions for subsea robotic actuation whereas the threaded version may save weight for a riser connection.

The present invention is for use with pipes or conduits through which hydrocarbons flow. In particular, the present invention relates to connectors for oil and gas pipelines including risers and flowlines which are subsea although at least a part of the pipe and hence the connector may be located above the sea.

The sleeve 4 encloses a lower end of an upper riser section 2 and is retained thereto. Once the sleeve 4 is secured to the lower riser section, this loosely secures the upper riser section 2 to the lower riser section 1. A tensioning tool then stretches the sleeve 4 upwardly and a retaining collar 5 is then manoeuvred in order to retain the sleeve 5 in this tensioned state after the release of the tensioning tool. This creates a preloaded connection between the upper riser section 2 and the lower riser section 1.

Figure 2:
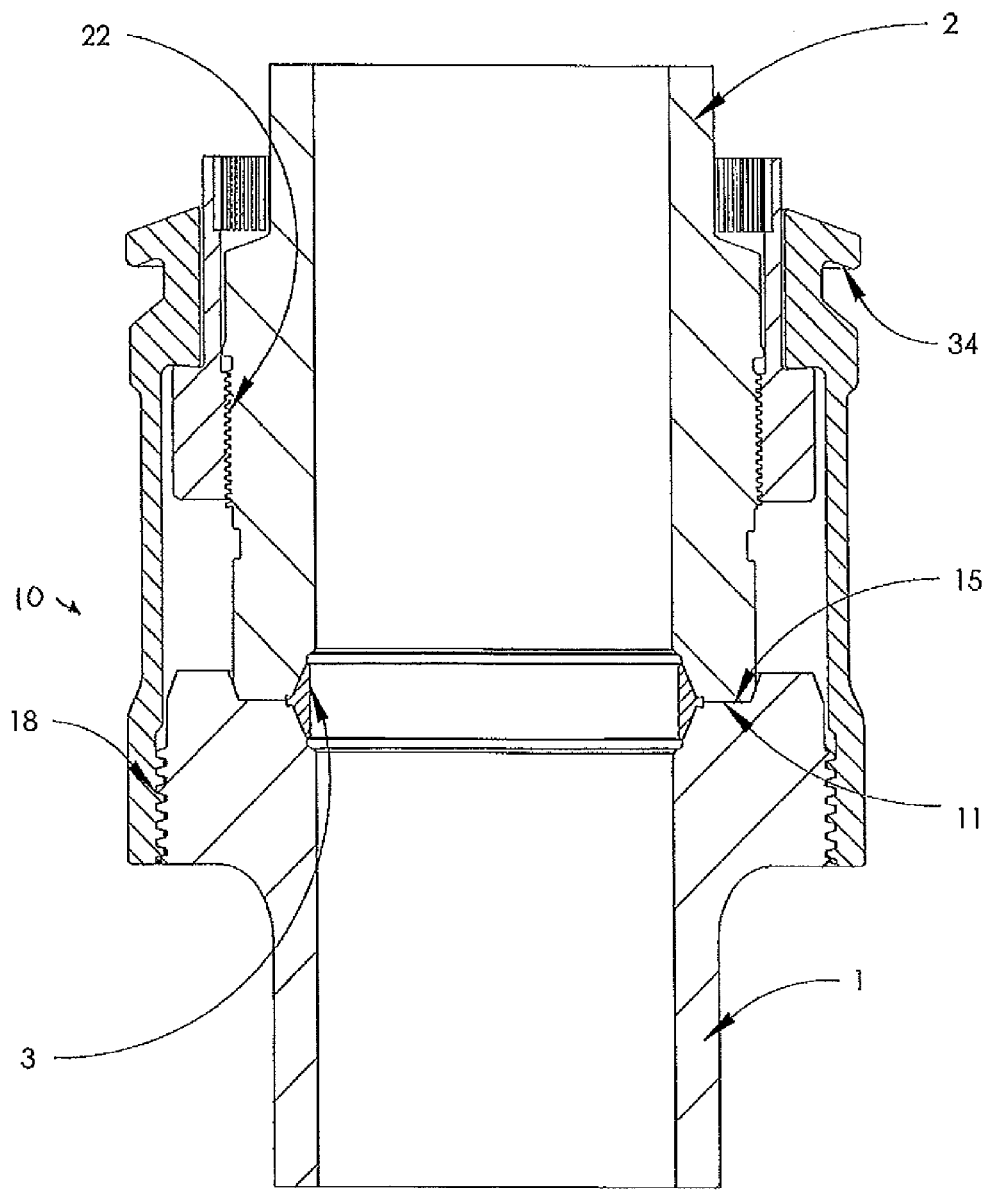
FIG. 2 is a side cross-section of a preferred embodiment of a connector connecting a first riser section to a second riser section.

As shown in FIG. 1 and FIG. 2, a preferred embodiment of a subsea connector 10 is arranged to connect a first riser section 1 to a second riser section 2. The first riser section 1 comprises a flanged portion 12 at the axial end thereof. In addition, the second riser section 2 comprises a flanged portion 14 at the axial end thereof.

The connector 10 is arranged to connect the riser sections 1, 2 such that the ends of the riser sections are urged towards each other to create a reliable and effective seal therebetween. In particular, a gasket 3 is arranged to locate between the first riser section 1 and the second riser section 2 and the gasket 3 creates the seal between the two sections 1, 2.

FIG. 1 shows the bottom sub-assembly, comprising the lower riser section 1 with the upward facing flange 12 and the metal gasket 3. The metal gasket 3 comprises an annular gasket which locates within a seating section provided on an inner upper surface of the lower riser section 1. A similar seating section is also provided on an inner lower surface of the upper riser section 2.

The outer surface of the lower riser section comprises a threaded portion 18. This threaded portion 18 extends around the periphery of the flange 12 and provides a meshing engagement surface for the sleeve 4. In particular, a corresponding threaded portion 20 is provided on an inner surface of the sleeve 4.

The top sub-assembly consists of the upper riser section 2 with the downward facing flange 14, the sleeve 4 and the threaded collar (retaining member) 5.

The upper riser section 2 comprises a threaded portion 22. This threaded portion 22 extends around the periphery of the flange 14 and provides a meshing engagement surface for the collar 5. In particular, a corresponding threaded portion 24 is provided on an inner surface of the collar 5. Prior to use, the collar 5 is engaged with the upper riser section 2 through the engagement of the corresponding threaded surfaces 22, 24. The collar 5 is initially positioned in a lower position on the threaded surface 22 of the upper riser section 2.

The top sub-assembly also comprises the sleeve 4. The sleeve 4 may be configured to be maintained in the top sub-assembly even when the connector does not connect the upper riser section 2 to the lower riser section 1.

The sleeve 4 comprises an annular sleeve member which is arranged to enclose the threaded collar 5. As explained above, the lower axial end of the sleeve includes a threaded portion 20 on the inner surface thereof. The sleeve 4 also comprises an inwardly projecting shoulder 26 which is arranged to abut and cooperate with a shoulder 28 provided on the collar 5. In particular, the two shoulders 26, 28 are arranged to abut each other and to thereby prevent relative axial movement of the collar 5, and hence the upper riser section 2, away from the lower riser section 1 in the connected state.

In use, the top sub-assembly is lowered onto the bottom sub-assembly until the downward facing flange face 15 mates with the upward facing flange face 11. This also requires the gasket 3 to contact with a sealing face 30 on the downward facing flange 14. The sleeve 4 is then lowered onto the upward facing flange 12 where the sleeve's internal thread 20 is fully wound onto the external thread 18 of the upward facing flange 12.

The sleeve 4 is then tensioned by a separate tool not described in this document. The tensioning tool may comprise a hydraulic tool which generates an upwards force on the upper end of the sleeve 4 and pulls the upper end of the sleeve upwardly. The tool acts against a shoulder 32 on the downward facing flange 14 of the upper riser section 2 and pulls up on an external load shoulder 34 of the sleeve 4. Since the lower end of the sleeve 4 is engaged with the lower riser section 1 the tool tensions the sleeve 4. Whilst the sleeve 4 is under tension, the internal thread 24 of the threaded collar 5 is wound upwards along the external thread 22 of the downward facing flange 14 of the upper riser section 2 until the load shoulder 28 of the threaded collar 5 meets and abuts the internal load shoulder 26 on the sleeve 4.

FIG. 2 shows the connector in the final state where the stretch of the sleeve 4 is locked between the downward facing flange thread 22 and the upward facing flange thread 18. This creates a preload between the downward facing flange face 15 and the upward facing flange face 11. This also compresses the gasket 3, sealing the connection. The tensioning tool is then deactivated and disengaged from the sleeve's external load shoulder 34 and removed from the connection.

The top sub-assembly comprise a concentric assembly with the sleeve 4 enclosing the collar 5 which locates around the outer periphery of the upper riser section 2. The components are not radially movable relative to each other but they are axially movable. However, in the fully connected configuration the components would not be rotatable or axially movable due to the tensioning of the sleeve 4.

The connection can also be disassembled by first landing the tensioning tool onto the shoulder 32 on the downward facing flange 14 of the upper riser section 2. A tensile load is then applied to the sleeve 4 at the shoulder 34, which releases the load on the shoulder 28 of the threaded collar 5, allowing the threaded collar 5 to be wound down the downward facing flange 12 external thread 22. The tension on shoulder 34 is then released returning the sleeve 4 to an unloaded state and enabling the sleeve 4 to be wound upwardly off the threaded portion 18 of the lower riser section 1. Once the sleeve 4 is wound off of the upward facing flange 12 the top sub-assembly can be lifted away from the bottom sub-assembly.

As shown in FIG. 3 to FIG. 9, the present invention can be orientated such that the first riser section 101 comprises the upper riser section and the second riser section 102 comprises the lower riser section. In this further embodiment, the bottom sub-assembly includes the lower riser section 102 together with the sleeve 104 and the threaded collar 105.

The top sub assembly comprises the upper riser section 101 with the associated flanged portion 112.

The bottom sub assembly comprises the lower riser section 102 with the associated flange portion 114, the sleeve 104 and the threaded collar 105. As previously described, the sleeve 104 encompasses and retains the threaded collar 105. The two riser sections 101, 102 are arranged to be connected together by the connector 110 with the threaded collar 105 acting to retain the sleeve in a tensioned configuration.

The installation of the connector 110 will now be described together with FIG. 3 to FIG. 9 which are arranged sequentially in the installation process.

In one embodiment, the connector is for use with a 7⅜" riser pipe and provides a connector assembly (10 ksi WP). The installation utilises a make up tool 201 and a riser spider 200. In the first step the riser pipe is lowered through the spider 200. The spider 200 can then be closed around the riser. A make up tool guide is used to centralise the joint prior to landing and supports the riser weight. The riser is landed on the spider 200 and the make up tool 201 remains in a retracted position. At this stage the sleeve 104 is supported on a compliant base.

A handling sub which is secured in the upper end of the lower riser section 102 can then be removed. This securement may comprise a hydraulic/internal groove type, a mechanical sleeve interface may be an option but the securement may comprise any suitable means. The gasket 103 can then be placed in position in the seating provided by the lower riser section 102.

Figure 3:
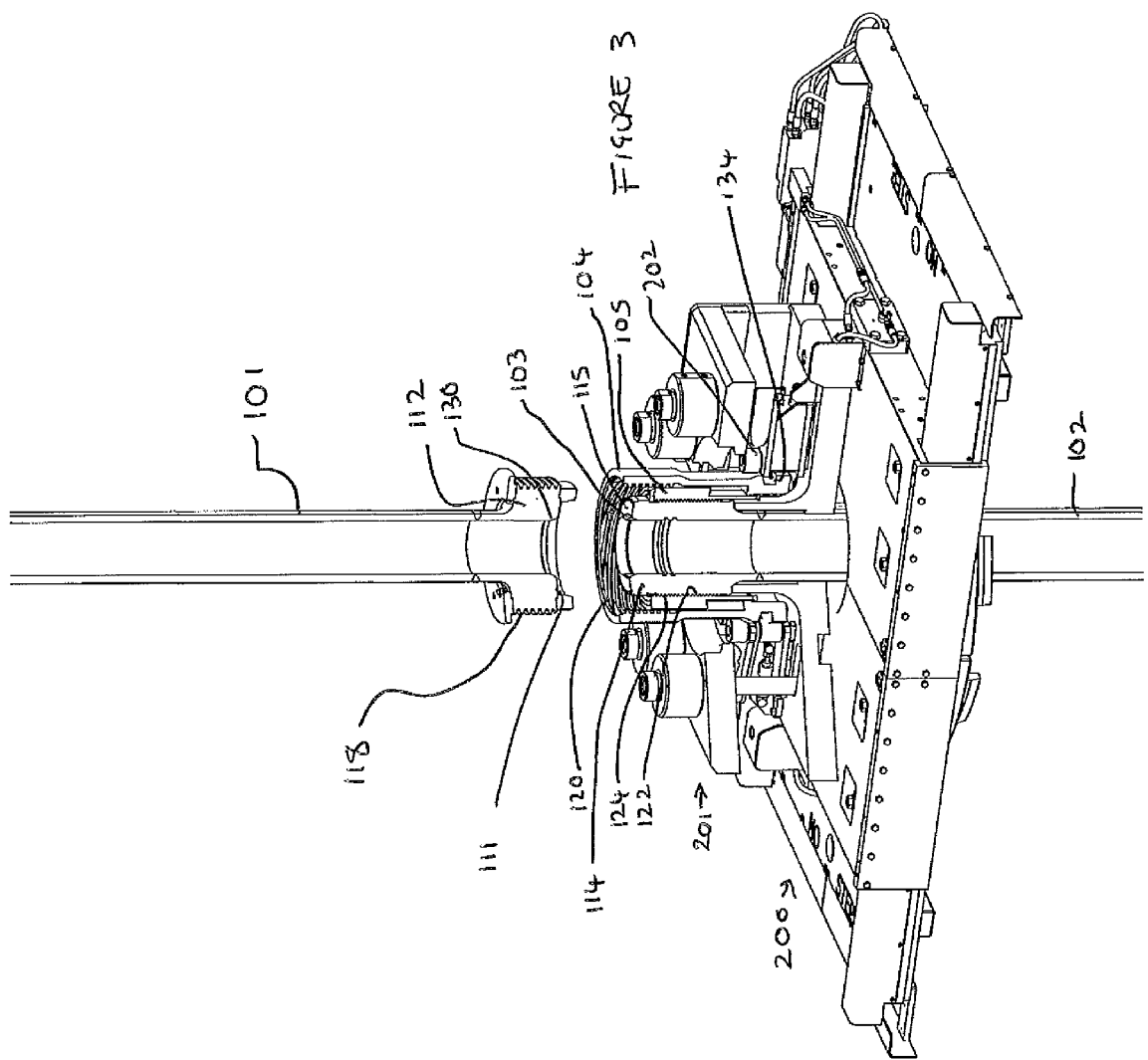
FIG. 3 is a perspective partial cross section of a further embodiment of a connector prior to connecting a first riser section to a second riser section together with an installation tool.
Figure 4:
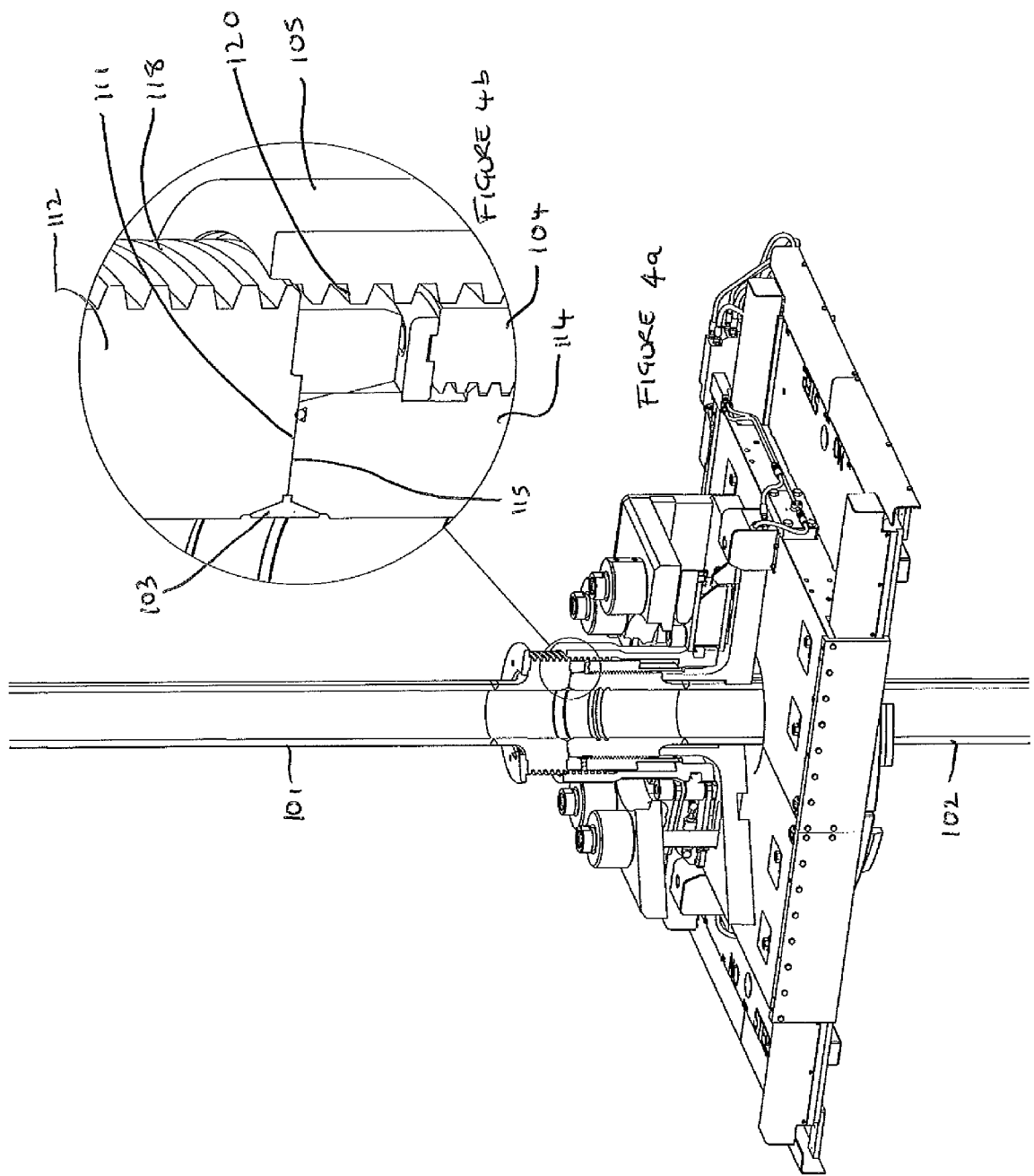
FIG. 4a is a perspective partial cross section of a further embodiment of a connector in an initial configuration with a first riser section and a second riser section together with an installation tool.
FIG. 4b is a detailed view of part of a further embodiment of a connector in an initial configuration with a first riser section and a second riser section.

The upper riser section 101 can then be lowered into position, as shown in FIG. 3. In this position, the lower sub assembly provides an annular opening into which the lower end of the upper riser section 101 can be inserted. In this initial position, the threaded collar 105 is in an upper position on the threaded section 122 around the lower riser section 102.

As the riser sections 101, 102 land and mate, the faces 111, 115 of the flanges 112, 114 abut and locate adjacent to each other. The sleeve 104 retracts under the weight of the joint and this keeps the associated threads 118, 120 of the riser sections 101, 102 in contact. This can be seen in FIG. 4a and, in more detail, in FIG. 4b.

Figure 5:
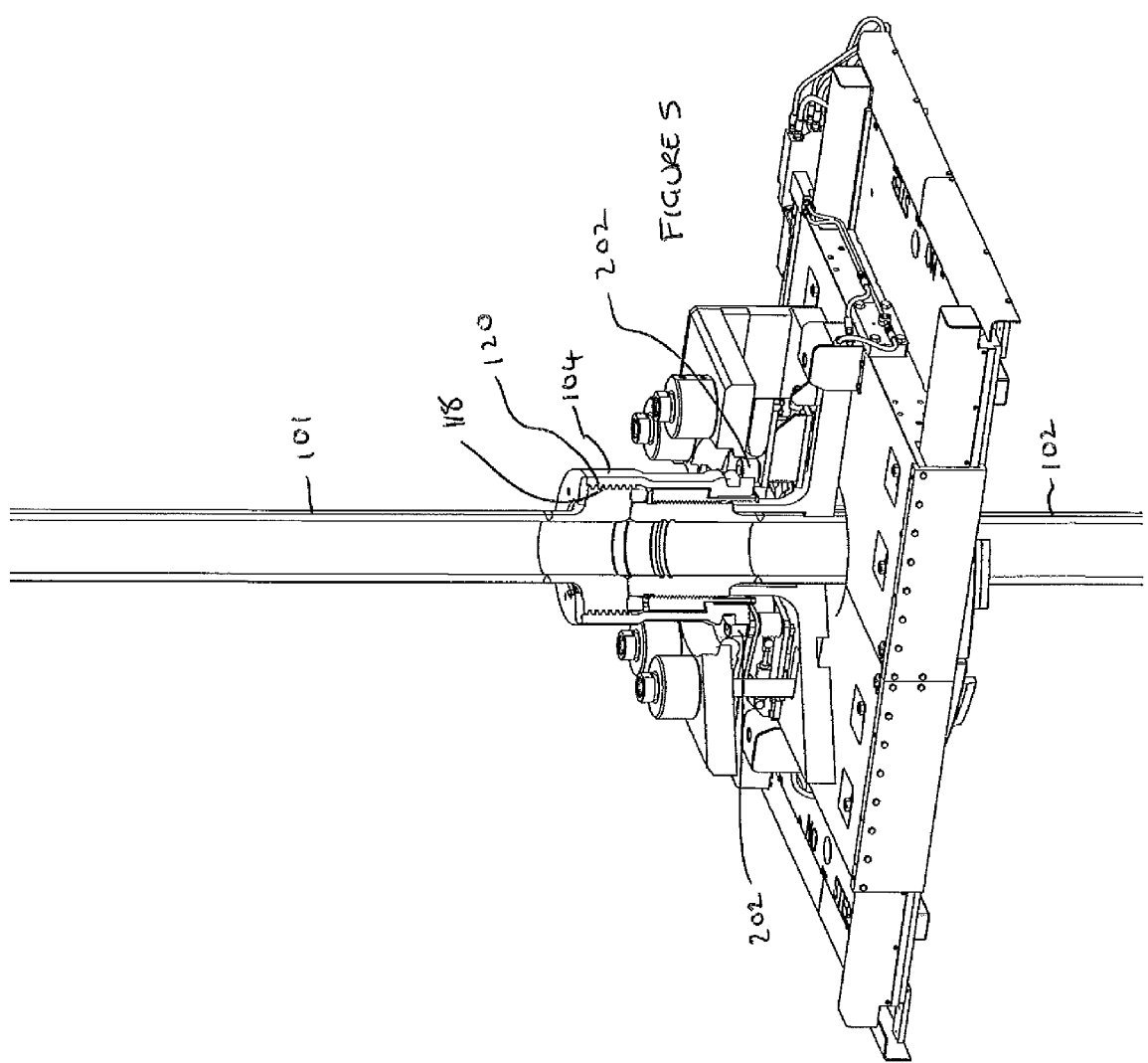
FIG. 5 is a perspective partial cross section of a further embodiment of a connector in a partially installed configuration with a first riser section and a second riser section together with an installation tool.
Figure 6:
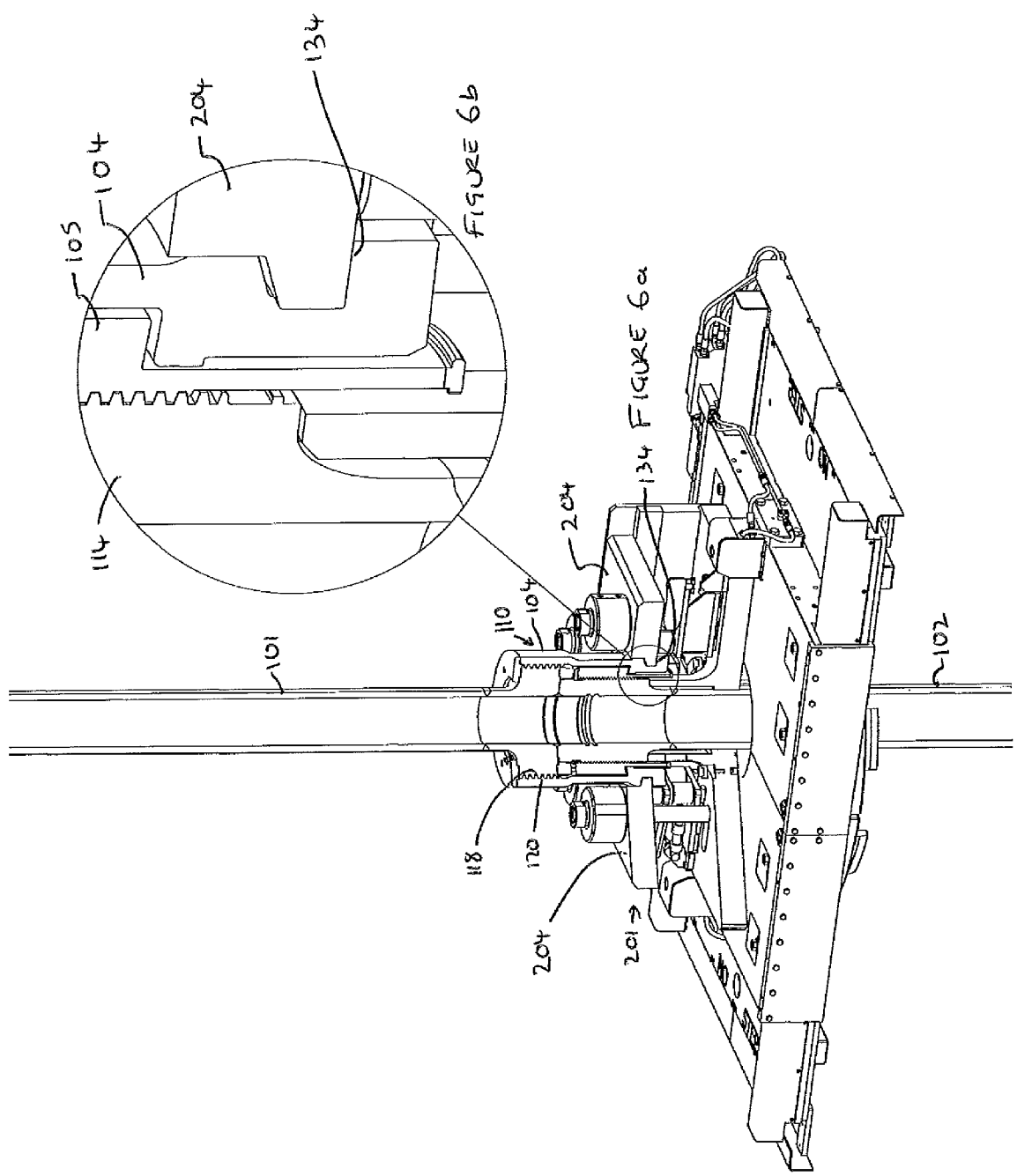
FIG. 6a is a perspective partial cross section of a further embodiment of a connector in a partially installed configuration with a first riser section and a second riser section together with an installation tool.
FIG. 6b is a detailed view of part of a further embodiment of a connector in a partially installed configuration with a first riser section and a second riser section.
Figure 7:
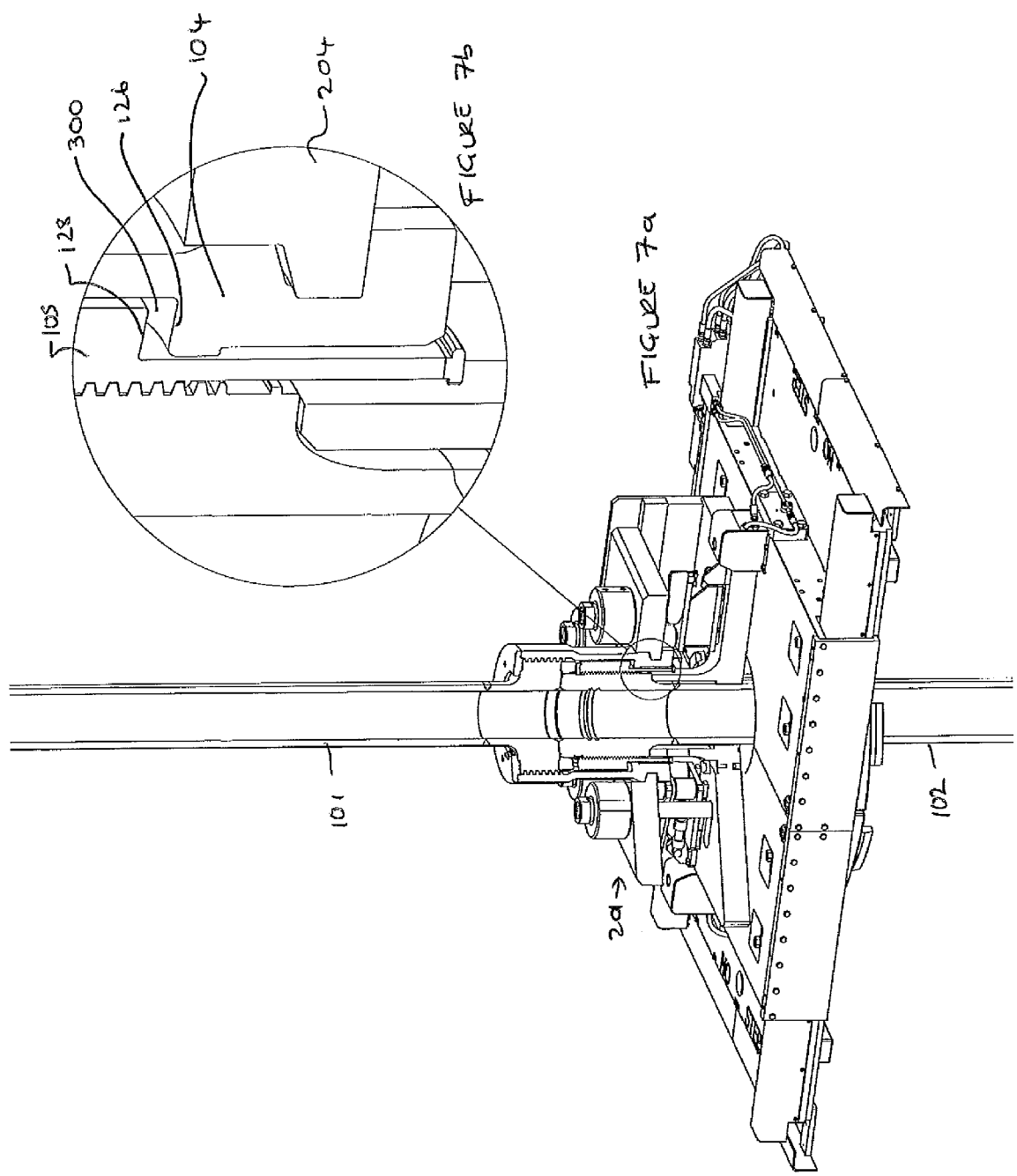
FIG. 7a is a perspective partial cross section of a further embodiment of a connector in a partially installed configuration with a first riser section and a second riser section together with an installation tool.
FIG. 7b is a detailed view of part of a further embodiment of a connector in a partially installed configuration with a first riser section and a second riser section.
Figure 8:
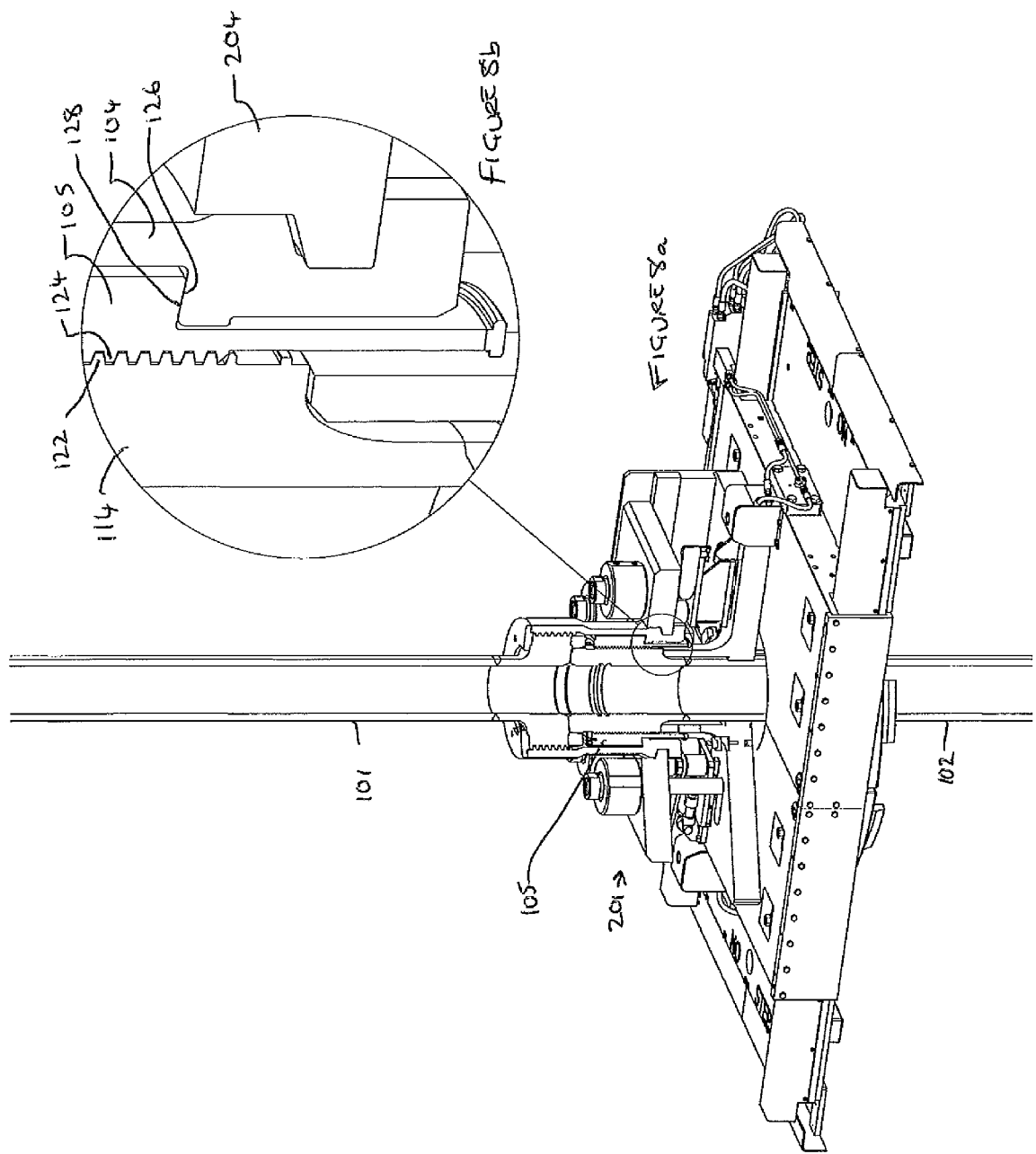
FIG. 8a is a perspective partial cross section of a further embodiment of a connector in a partially installed configuration with a first riser section and a second riser section together with an installation tool.
FIG. 8b is a detailed view of part of a further embodiment of a connector in a partially installed configuration with a first riser section and a second riser section.

The make up tool 201 is then operated in order to move the sleeve rollers 202 inwardly which are then arranged to be driven (rotated). The sleeve rollers 202 are then actuated to spin the sleeve 104 upwardly. The sleeve 104 comprises a coarse thread 120 together with the associated thread 118 on the upper riser section 101. In some embodiments, the full engagement of the sleeve 104 with the upper riser section 101 is achieved in less than one turn and involves no significant torque. This engaged position is shown in FIG. 5.

The sleeve rollers 202 can then be retracted.

The make up tool 201 can then be closed around the connector 110, as shown in FIG. 6a and FIG. 6b. In this position, the load plates 204 interface with the sleeve shoulder 134. The make up tool 201 comprises two load plate halves 204 which are pinned together in this configuration.

The make up tool 201 can then be operated in order to actuate tension cylinders which operate to stretch the sleeve 104. In particular, the load plates 204 which are engaged with the shoulder 134 of the sleeve 104 and the load plates 204 are moved downwardly in order to move the lower end of the sleeve 104 downwardly. Since the upper end of the sleeve 104 is engaged through the threads 118, 120 with the upper riser section 101, this effectively stretches the sleeve 104 and places the sleeve 104 in tension. As can be seen in FIG. 7a and FIG. 7b, this also creates a small gap 300 between the shoulder 128 of the threaded collar 105 and an inner shoulder 126 of the sleeve 105.

The make up tool 201 is arranged to then wind down the collar 105 through the rotation of the threaded collar 105 relative to the lower riser section 102. The corresponding threads 122, 124 mean that the rotation of the collar 105 moves the shoulder 128 of the collar downwardly and decreases the gap 300 with the shoulder 126 of the sleeve. This operation moves the collar 105 downwardly until the shoulders 126, 128 abut each other. This position is clearly shown in FIG. 8*a* and FIG. 8*b*. This operation effectively locks the connector 110 in the desired preload configuration.

Figure 9:
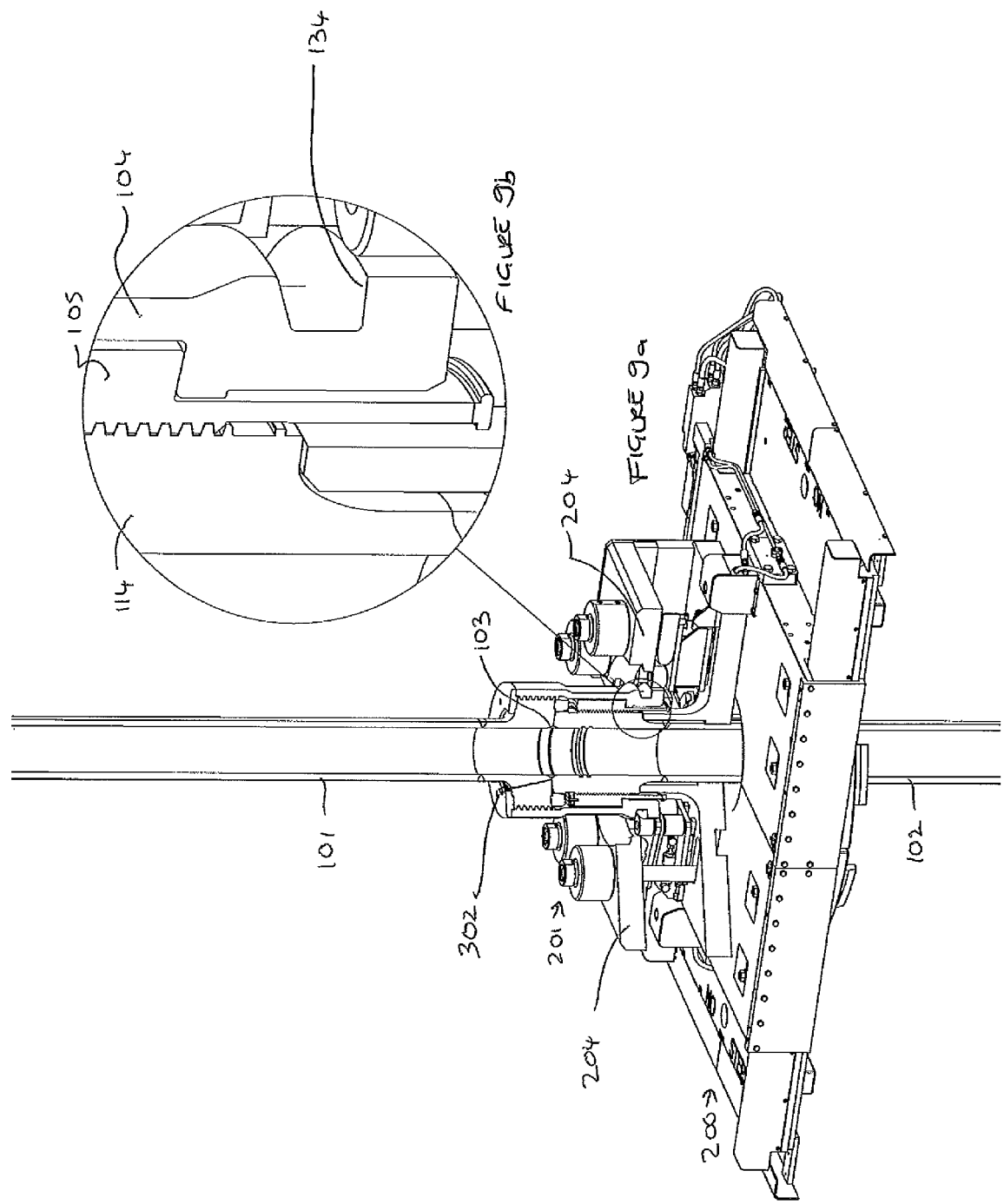
FIG. 9a is a perspective partial cross section of a further embodiment of a connector in an installed configuration with a first riser section and a second riser section together with an installation tool in a disengaged position.
FIG. 9b is a detailed view of part of a further embodiment of a connector in an installed configuration with a first riser section and a second riser section.

Finally, the tension placed on the sleeve 104 is released and the load plates 204 are retracted by the make up tool 201. The connector 110 is then in an installed position with the upper riser section 101 securely connected to the lower riser section 102 as shown in FIG. 9. The preload may exceed the equivalent API spec 6A 10M flange.

The seating of the gasket 103 can be tested via a back seat testing port 250 as shown in FIG. 9. To finalise the installation, the riser may be lifted relative to the riser spider 200 and the spider 200 can then be opened such that the riser (and the connector 110) can then be lowered through the open riser spider 200. The tooling can then be used to connect further sections to the riser.

Another embodiment of a connector is shown in FIG. 10 to FIG. 18. In this embodiment, the first riser section 401 comprises the upper riser section and the second riser section 402 comprises the lower riser section. Accordingly, in this embodiment, the bottom sub-assembly includes the lower riser section 402 together with the sleeve 404 and the threaded collar 405. The top sub-assembly comprises the upper riser section 401 with the associated flange portion 412 and the associated threaded portion 418.

In this embodiment, the connector assembly also includes means for maintaining the sleeve retained to the lower riser section 402 when the connector 400 is not connecting the upper riser section 401 to the lower riser section 402. This retaining means comprises a flange 500 which extends around the outer periphery of the lower riser section 402. The outer diameter of this circular circumferential flange is greater than the inner diameter of the sleeve 404. Accordingly, the sleeve is not able to slide over the flange 500. In addition, the sleeve 404 cannot be slidably removed from the lower riser section in the opposite axial direction due to the collar 405 and specifically the shoulder 428. In this arrangement, the sleeve 404 is effectively trapped and retained between the shoulder 428 and the upper shoulder 501 provided by the retaining flange 500.

The flange 500 also provides an oppositely facing flange which enables the lower riser section 402 to be landed on the make up tool 400. Since this landing shoulder is located below the actual connector and also external from the sleeve 404, this does not significantly restrict the dimensions of the flange 500 and the landing shoulder 502. In some embodiments, the landing mechanism may be located within the sleeve and thereby within the connector, and in these arrangements, the surface area on the landing shoulder may be restricted since the landing means and the landing surface may have to extend into the sleeve. The landing shoulder 502 is arranged to be supported on an upper surface of a support surface provided by the make up tool 400. In the first embodiment, it can be seen that this landing shoulder is located within the sleeve such that the make up tool includes an upwardly projecting cylindrical support element. In order for the upper supporting surface of this cylindrical element to abut this landing shoulder, the cylindrical element must be relatively thin in order to pass through the annular gap created between the lower end of the sleeve 4 and the outer surface of the riser section 1. However, with the embodiment shown in FIG. 10 to FIG. 18, the landing shoulder is provided on a part of the riser section 402 which is located spaced from the end of the riser section 402 and, specifically, at a location below the lower end of the sleeve 404. This means that the support surface of the make up tool does not need to project through an annular gap between the sleeve and the outer surface of the riser section. This support surface can therefore be more robust and the sizes of the landing shoulder and the support surface can be enlarged. The size and shape of the landing shoulder and the cooperating support surface may be designed for the situation with a greater degree of flexibility.

In this embodiment, the landing shoulder is down below the connector, this has the advantage of allowing the size of the landing shoulder to be increased without affecting the connector diameter. In addition, the landing shoulder acts as a retainer for the sleeve, so the sleeve is trapped on the end of the connector and cannot fall off.

In this embodiment the make up tool 400 has also been updated. The make up tool 400 is still based on a sliding base plate, but the tensioning plates are now in six segments and this is mechanically more efficient.

The six tensioning plates (or load plates) may be arranged to be equally radially spaced around the riser section 402/sleeve 404.

FIG. 12 to FIG. 18 demonstrate this further embodiment of a connector in accordance with the present invention with the connector being used to make a connection between two sections of a riser string and these figures are arranged sequentially in the installation process.

Overall, the connector enables two adjacent riser sections 1, 2 to be connected to each other within a subsea riser string. The connector is relatively simple and provides an effective seal. The connector also provides a preloaded connection in which the riser sections 1, 2 are urged towards each other and compress a gasket therebetween.

The operation can be quickly and reliably carried out and, in particular, the connection can be achieved by robotic tooling. Accordingly, the present invention enables subsea make up via robotic tooling. This could be enabled through the use of a standard subsea pull in and guidance system augmenting an automated tool.

Since the present invention only requires relatively simple movements to lock and operate the components, the present invention can be operated by robotic vehicles. Accordingly, the present invention can be utilised at depths and in environments that are not suitable for divers where the operation can be achieved by robotic vehicles.

The sleeve/flange arrangement may be utilised in a high pressure drilling riser which is deployed partly subsea and partly above water. The flange may be made up on a drill rig by rig personnel and the riser may be deployed for 2 months during which time a well is drilled. This flange may provide a significant advantage over prior art connections due to an increased speed in operation which will subsequently reduce the drill rig cost.

Furthermore, the connector may be particularly useful for subsea robotic connections. This advantage is not limited to riser connections and the connector could be used on any piece of subsea flow equipment. Accordingly the present invention provides a general subsea flow connector. The connector is for use with pipelines (including risers and flowlines) for fluid hydrocarbons and, specifically, oil and gas pipelines.

The invention claimed is:

1. A connector assembly comprising a first pipe section (1), a second pipe section (2) and a connector (10) for connecting the first pipe section (1) to the second pipe section (2), the connector (10) comprising a sleeve (4) comprising engagement means (20) for engaging with the first pipe section (1), the connector (10) further comprising a retaining member (5) comprising engagement means (24) for engaging with the second pipe section (2), the sleeve (4) being operable between a rest configuration and a tensioned configuration and the retaining member (5) being movable to retain the sleeve (4) in the tensioned configuration characterised in that the sleeve (4) is mounted to the retaining member (5) and the second pipe section (2) prior to the connection to the first pipe section (1) and the retaining member (5) comprises an annular collar which locates concentrically between the sleeve (4) and the second pipe section (2) and wherein the sleeve (4) comprises tool engagement means which enables a tensioning tool to stretch the sleeve (4) and to create a gap (300) between the retaining member (5) and the sleeve (4) and the retaining member (5) is then manoeuvred in order to close the gap (300) and abut the sleeve (4) to retain the sleeve (4) in this tensioned state after the release of the tensioning tool.

2. A connector assembly according to claim 1 in which a tensioning tool is engageable with the sleeve (4) in order to place the sleeve (4) in tension and wherein the tensioning tool is arranged to move a second end of the sleeve (4) away from a first end of the sleeve (4) when the first end of the sleeve (4) is engaged with the first pipe section (1) and in which the tensioning tool is arranged to move the second end of the sleeve (4) away in an axial direction from the first pipe section (1).

3. A connector assembly according to claim 1 in which the connector assembly comprises a sleeve tensioning mechanism which involves initially stretching the sleeve (4) and then winding the retaining member (5) to retain the sleeve (4) in tension.

4. A connector assembly according to claim 1 in which, whilst the sleeve (4) is under tension, an internal thread (24) of the retaining member (5) is wound upwards along an external thread (22) of the second pipe section (2) until a load shoulder (28) of the retaining member (5) meets and abuts an internal load shoulder (26) on the sleeve (4).

5. A connector assembly according to claim 1 in which, in a final state, a stretch of the sleeve (4) is locked between a thread (22) on the second pipe section (2) and a thread (18) on the first pipe section (1).

6. A connector assembly according to claim 1 in which the sleeve (4) is engaged with the first pipe section (1) and in which the sleeve (4) comprises an internal thread (20) which is arranged to engage with an external thread (18) provided on the first pipe section (1).

7. A connector assembly according to claim 1 in which the sleeve (4) is arranged, in use, to be secured to the first pipe section (1) and then the sleeve (4) is tensioned and retained in the tensioned state by the retaining member (5) such that the first pipe section (1) is sealed to the second pipe section (2) with the pipe sections (1, 2) being axially urged towards each other by the tension in the sleeve (4).

8. A connector assembly according to claim 1 in which the retaining member (5) comprises an internal thread (24) which is arranged to engage with an external thread (22) provided on the second pipe section (2).

9. A connector assembly according to claim 1 in which the retaining member (5) comprises a securement portion (28) which cooperates with a securement portion (26) provided on the sleeve (4).

10. A connector assembly according to claim 9 in which the securement portions (26, 28) comprise abutment surfaces which abut each other to retain the sleeve (4) in a tensioned configuration.

11. A connector assembly according to claim 1 in which the connector assembly further comprises a tool wherein the tool is engageable with the sleeve (4) in order to place the sleeve (4) in tension.

12. A connector assembly according to claim 11 in which the tool moves a second end of the sleeve (4) away from a first end of the sleeve (4) when the first end of the sleeve (4) is engaged with the first pipe section (1).

13. A connector assembly according to claim 11 in which the tool moves the second end of the sleeve (4) away from the first pipe section (1) and the tool moves the second end of the sleeve (4) away in an axial direction from the first pipe section (1).

14. A connector assembly according to claim 1 in which the annular collar which is concentrically arranged with the sleeve (4) and in which the collar (5) comprises an outwardly projecting shoulder (28) and the outwardly projecting shoulder (28) comprises a circumferential shoulder (28) extending around the outer periphery of the collar (5).

15. A connector assembly according to claim 1 in which the sleeve (4) comprises an inwardly projecting shoulder (26) and the inwardly projecting shoulder (26) comprises a circumferential shoulder (26) extending around the inner periphery of the sleeve (4).

16. A connector assembly according to claim 15 in which the annular collar is concentrically arranged with the sleeve (4) and in which the collar (5) comprises an outwardly projecting shoulder (28) and the outwardly projecting shoulder (28) comprises a circumferential shoulder (28) extending around the outer periphery of the collar (5) and wherein the outwardly projecting shoulder (28) of the collar (5) is arranged to abut the inwardly projecting shoulder (26) of the sleeve (4) in order to maintain the sleeve (4) in a tensioned state.

17. A connector assembly according to claim 1 in which the connector (10) is arranged to urge the first pipe section (1) towards the second pipe section (2).

18. A connector assembly according to claim 1 in which the connector (10) is arranged to compress a gasket (3) located between the first pipe section (1) and the second pipe section (2).

19. A connector assembly according to claim 1 in which the connector (10) comprises a bottom sub-assembly comprising the second pipe section (2), the retaining member (5) and the sleeve (4) and wherein the connector (10) comprises landing means to enable the bottom sub-assembly to be landed on a support surface and, in which, the landing means comprises a landing shoulder which is provided on the second pipe section (2).

20. A method of connecting a first pipe section (1) to a second pipe section (2), the method comprising engaging a sleeve (4) with the first pipe section (1), the method further comprising engaging a retaining member (5) with the second pipe section (2), the method further comprising tensioning the sleeve (4) from a rest configuration to a tensioned configuration and moving the retaining member (5) to retain the sleeve (4) in the tensioned configuration characterised by mounting the sleeve (4) to the retaining member (5) and the second pipe section (2) prior to connecting the second pipe section (2) to the first pipe section (1) and wherein the retaining member (5) comprises an annular collar which locates concentrically between the sleeve (4) and the second pipe section (2) and stretching the sleeve (4) with a tensioning tool to create a gap (300) between the retaining member (5) and the sleeve (4) and then manoeuvring the retaining member (5) in order to close the gap (300) and abut the sleeve (4) to retain the sleeve (4) in this tensioned state after the release of the tensioning tool.

\* \* \* \* \*